US010962078B2

(12) United States Patent
DeBruler

(10) Patent No.: US 10,962,078 B2
(45) Date of Patent: *Mar. 30, 2021

(54) END MEMBER AND GAS SPRING ASSEMBLY INCLUDING SAME

(71) Applicant: Firestone Industrial Products Company, LLC, Nashville, TN (US)

(72) Inventor: Brian S. DeBruler, Cottontown, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,543

(22) Filed: Apr. 23, 2018

(65) Prior Publication Data
US 2018/0238412 A1 Aug. 23, 2018

Related U.S. Application Data

(63) Continuation of application No. 14/892,852, filed as application No. PCT/US2014/039085 on May 22, 2014, now Pat. No. 9,951,837.
(Continued)

(51) Int. Cl.
*F16F 9/04* (2006.01)
*B60G 11/27* (2006.01)
*F16F 9/05* (2006.01)

(52) U.S. Cl.
CPC ............ *F16F 9/0454* (2013.01); *B60G 11/27* (2013.01); *F16F 9/0463* (2013.01); *F16F 9/05* (2013.01);
(Continued)

(58) Field of Classification Search
CPC ........ B60G 2206/424; B60G 2204/126; B60G 2204/1262; B60G 2202/152; F16L 33/30;
(Continued)

(56) References Cited

U.S. PATENT DOCUMENTS 48,709 A 7/1865 Emery
3,819,166 A 6/1974 Ellis et al.
(Continued)

FOREIGN PATENT DOCUMENTS

DE 102008004391 A1 7/2009
EP 0295392 12/1988
(Continued)

OTHER PUBLICATIONS

International Search Report and Written Opinion for corresponding patent application No. PCT/US2014/039085 dated Sep. 5, 2014.
(Continued)

*Primary Examiner* — Bradley T King
*Assistant Examiner* — Stephen M Bowes
(74) *Attorney, Agent, or Firm* — Thomas R. Kingsbury; Matthew P. Dugan

(57) ABSTRACT

An end member is dimensioned to engage an end of a flexible spring member to at least partially form a gas spring assembly. The end member includes an end member wall that has a longitudinal axis. The end member includes a securement wall portion having an outer surface with a surface profile dimensioned to abuttingly engage the end of the flexible spring member. The surface profile includes a plurality of concave profile sections and a plurality of convex profile sections that are dimensioned to generate a progressively increasing compression force along at least a section of the securement wall portion. A gas spring assembly including such an end member is included. A suspension system including one or more gas spring assemblies and a method of assembly are also included.

20 Claims, 6 Drawing Sheets

Related U.S. Application Data

(60) Provisional application No. 61/826,314, filed on May 22, 2013.

(52) U.S. Cl.
CPC .. *B60G 2202/152* (2013.01); *B60G 2206/424* (2013.01)

(58) Field of Classification Search
CPC . F16L 33/207; F16L 33/2071; F16L 33/2073; F16L 33/2076; F16F 9/0463; F16F 9/0454; F16F 9/05; F16F 9/04; F16F 9/052; F16F 9/057
USPC ....... 285/231, 232, 236, 259, 330, 382, 239, 285/334.3; 267/64.27, 64.24
See application file for complete search history.

(56) References Cited

U.S. PATENT DOCUMENTS

| | | |
|---|---|---|
| 4,616,855 A | 10/1986 | Ruble |
| 4,784,376 A | 11/1988 | Ecktman |
| 4,787,606 A | 11/1988 | Geno et al. |
| 4,899,995 A | 2/1990 | Hoffman et al. |
| 5,622,393 A | 4/1997 | Elbich et al. |
| 5,649,691 A | 7/1997 | Handke et al. |
| 6,536,749 B1 | 3/2003 | Luhmann, et al. |
| 6,619,635 B1 | 9/2003 | Hilburger et al. |
| 6,719,279 B1 * | 4/2004 | Koch ................ F16F 9/0409 267/64.24 |
| 6,749,184 B2 | 6/2004 | Wode et al. |
| 6,845,973 B2 | 1/2005 | Ferrer |
| 7,175,165 B1 | 2/2007 | Vande Brake et al. |
| 8,800,974 B2 | 8/2014 | Howard et al. |
| 9,951,837 B2 * | 4/2018 | DeBruler .............. F16F 9/0463 |
| 2002/0043746 A1 | 4/2002 | Wode |

FOREIGN PATENT DOCUMENTS

| | | |
|---|---|---|
| EP | 0872664 | 10/1998 |
| EP | 2060832 | 5/2009 |
| EP | 2060832 B1 | 9/2015 |

OTHER PUBLICATIONS

German-language Office Action issued by German Patent Office in connection with corresponding German Patent Application No. 11 2014 002 513.5 dated Dec. 5, 2019 as well as an English-language translation of the Office Action.

Search Report and Written Opinion for corresponding German Patent Application No. 11 2014 002 513.5 dated Dec. 5, 2019.

* cited by examiner

END MEMBER AND GAS SPRING ASSEMBLY INCLUDING SAME

This application is a continuation of U.S. patent application Ser. No. 14/892,852, filed on Nov. 20, 2015, now U.S. Pat. No. 9,951,837, issued on Apr. 24, 2018, which is the National Stage of International Application No. PCT/US2014/039085, filed on May 22, 2014, which claims the benefit of priority from U.S. Provisional Patent Application No. 61/826,314, filed on May 22, 2013, the subject matter of each of which is hereby incorporated herein by reference in its entirety.

BACKGROUND

The subject matter of the present disclosure broadly relates to the art of gas spring devices and, more particularly, to an end member including a progressively-varied crimp area as well as a gas spring assembly including such an end member. A suspension system can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, the spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members. A wide variety of arrangements for securing the flexible wall on or along an end member have been developed, and it is recognized that different securing arrangements have different advantages, such as low cost, improved sealing or reliability, high strength and/or a capability of disassembly and/or repair, for example. Thus, different securing arrangements may be employed in different applications depending upon the particular conditions under which the gas spring assembly is intended for use, such as applications during which elevated internal gas pressures, over-extension conditions and/or exposure to low temperatures may be experienced. In many cases, a different securing arrangement may be selected and used on each of the two different end members of a gas spring assembly.

Notwithstanding to overall success of known securing arrangements, it is believed desirable to develop end members for gas spring assemblies that are capable of providing improved retention and/or securement of the flexible wall and overcoming disadvantages of known constructions while promoting relatively low costs of manufacture, ease of assembly and/or otherwise advancing the art of gas spring devices.

BRIEF SUMMARY

One example of an end member in accordance with the subject matter of the present disclosure that is dimensioned to engage an associated flexible spring member of an associated gas spring assembly can include an end member wall having a longitudinal axis. The end member wall can include an end wall portion and a securement wall portion. The end wall portion can extend transverse to the axis and can include an outer surface that is dimensioned to abuttingly engage an associated structural component. The securement wall portion can extend longitudinally from along the end wall portion and can include an outer peripheral extent with first, second and third grooves extending radially inward into the securement wall portion from along the outer peripheral extent. The first, second and third grooves can be disposed in axially-spaced relation to one another such that a plurality of ridges can be formed along the securement wall portion. One of the plurality of ridges can be positioned between adjacent ones of the first, second and third grooves such that the plurality of ridges are disposed in axially-spaced relation to one another. Each of the first, second and third grooves can have a groove depth with the groove depths progressively decreasing in an axial direction such that the first, second and third grooves are capable of generating a variable-compression wedge effect during abutting engagement with the associated flexible spring member.

Another example of an end member in accordance with the subject matter of the present disclosure that is dimensioned to engage an associated flexible spring member of an associated gas spring assembly can include an end member wall having a longitudinal axis. The end member wall can include an end wall portion and a securement wall portion. The end wall portion can extend transverse to the axis and can include an outer surface that is dimensioned to abuttingly engage an associated structural component. The securement wall portion can include an outer surface with a surface profile dimensioned to abuttingly engage the associated flexible spring member. The surface profile can include at least a first, second and third concave profile sections and at least first and second convex profile sections interposed between adjacent ones of the first, second and third concave profile sections. At least the first, second and third concave profile sections of the surface profile can be dimensioned to generate a progressively increasing compression force along at least a section of the longitudinal length of the securement wall portion upon application of a radially-in word retention force applied approximately uniformly along the longitudinal length of the securement wall portion and biasing the associated flexible spring member in a radially-inward direction.

One example of a gas spring assembly in accordance with the subject matter of the present disclosure can include a flexible spring member having a longitudinal axis and including a flexible wall extending peripherally about the longitudinal axis to at least partially define a spring chamber. The flexible wall can extend between a first end and a second end that is spaced longitudinally from the first end. The flexible wall can include an end wall portion disposed along at least one of the first and second ends and can terminate at a flexible wall edge. A first end member can be secured along the first end of the flexible spring member such that a substantially fluid-tight seal is formed therebetween. A second end member according to either of the foregoing paragraphs can be secured along the second end of the flexible spring member such that a substantially fluid-tight seal is formed therebetween. A retaining ring can extend about the axis and in abutting engagement with the end wall portion of the flexible wall such that the end wall portion can be biased into engagement with at least a longitudinal section of the securement wall portion of the second and member.

One example of a suspension system can include at least one gas spring assembly according to the foregoing paragraph and a pressurized gas system in fluid communication with the spring chamber of the at least one gas spring assembly.

One example of a method of manufacturing a gas spring assembly in accordance with the subject matter of the present disclosure can include providing a flexible spring member that has a longitudinal axis and includes a flexible wall extending peripherally about the longitudinal axis. The flexible wall can extend between a first end and a second end but is spaced longitudinally from the first end. The flexible wall can also include an end wall portion that is disposed along at least one of the first and second ends and terminates at a flexible wall edge. The method can also include providing a first end member and securing the first end member along the first end of the flexible spring member such that a substantially fluid-tight seal is formed therebetween. The method can further include providing a second and member according to either of the two above paragraphs and extending the end wall portion of the flexible wall along the securement wall portion of the second and member. The method can also include providing a retaining ring that extends peripherally about an axis and positioning the retaining ring adjacent the end wall portion of the flexible wall radially outward of the securement wall portion of the second and member. The method can further include deforming the retaining ring and a radially-inward direction such that the end wall portion of the flexible wall is biased into engagement with at least a longitudinal section of the securement wall portion of the second end member such that a substantially fluid-tight seal is formed therebetween.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
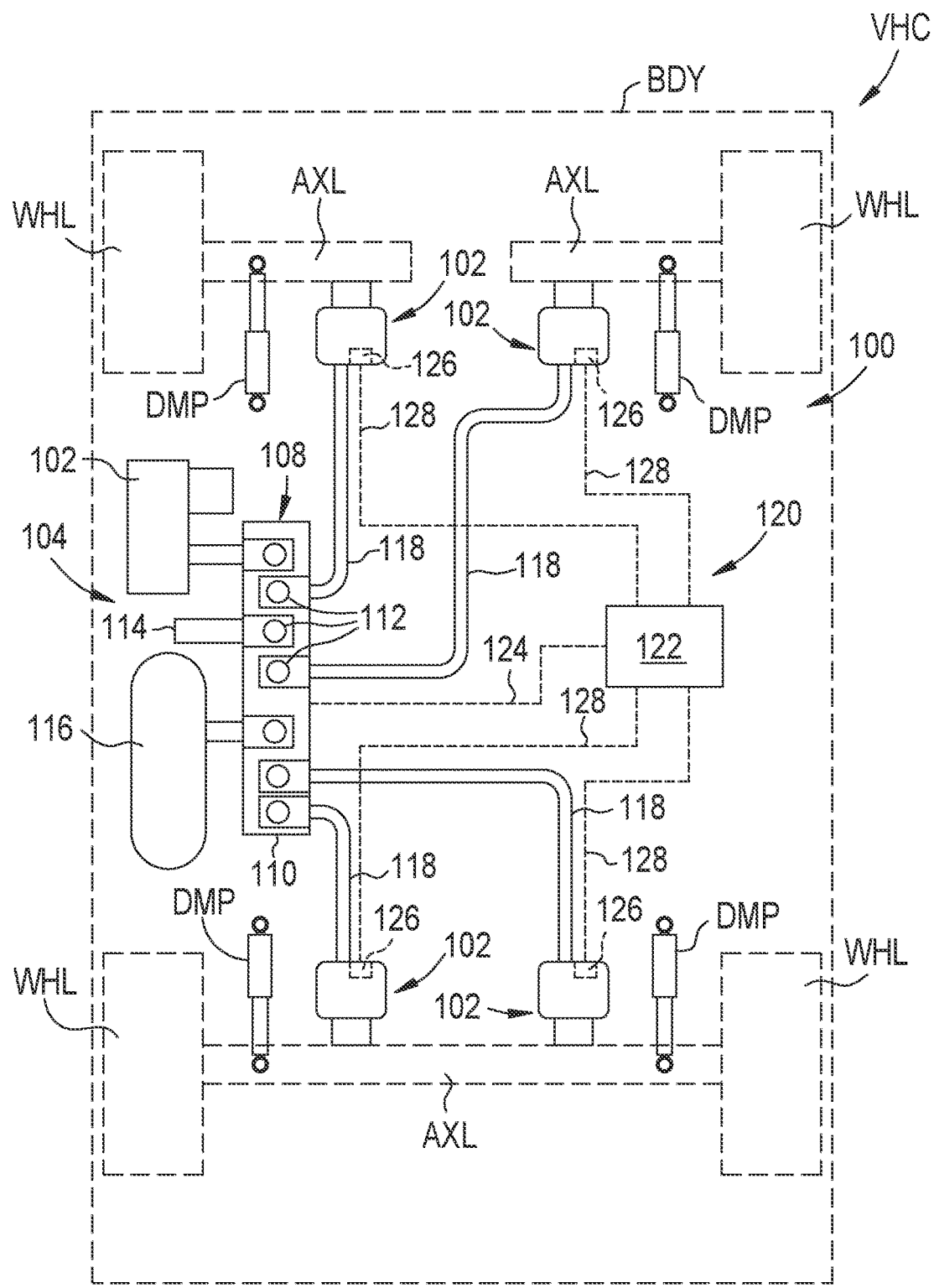
FIG. 1 is a schematic representation of one example of a suspension system of an associated vehicle including gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 can be in fluid communication with gas spring assemblies 102 in any suitable manner, such as through suitable gas transfer lines 118, for example. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

Figure 2:
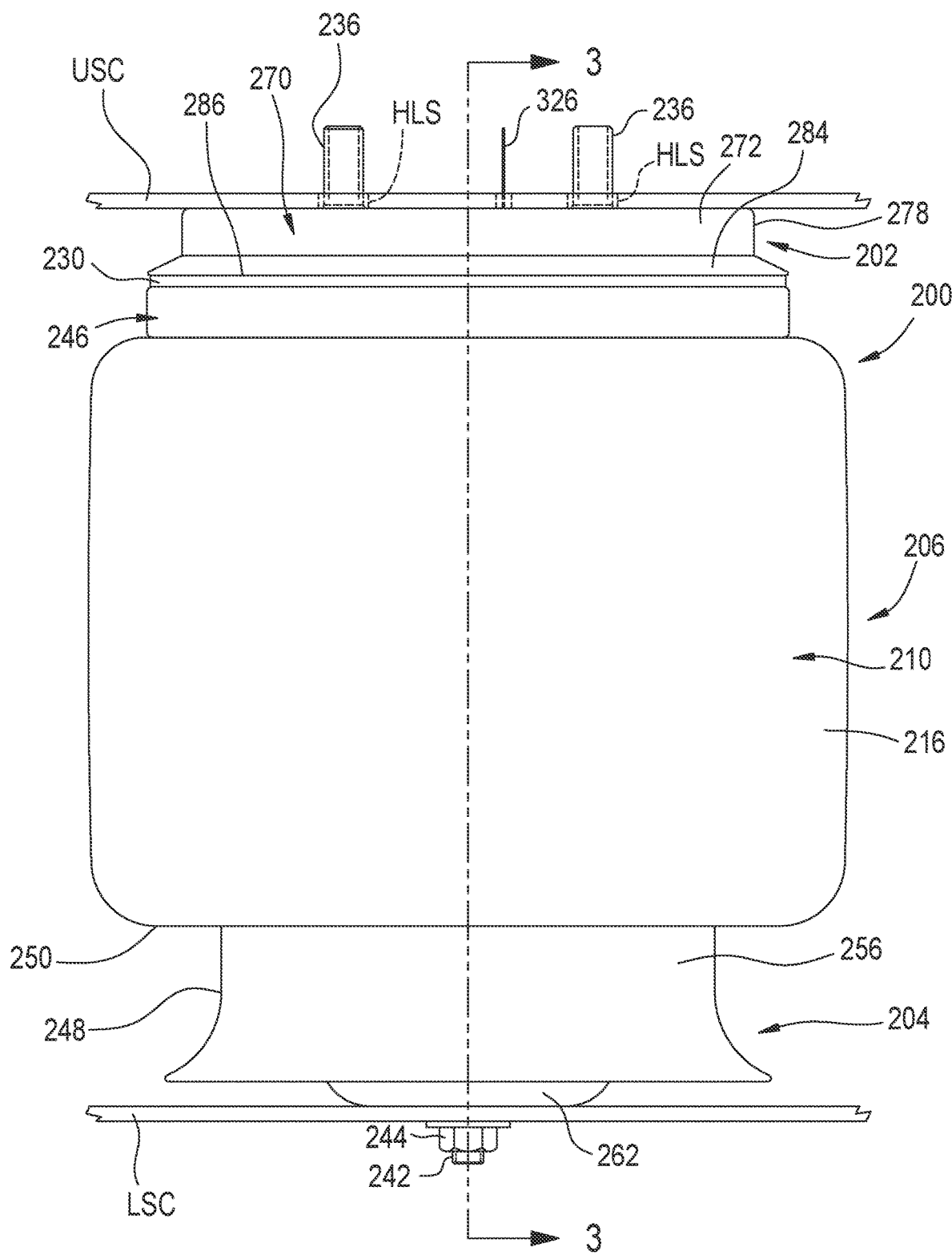
FIG. 2 is a side elevation view of one example of a gas spring assembly that includes one example of an end member in accordance with the subject matter of the present disclosure.
Figure 3:
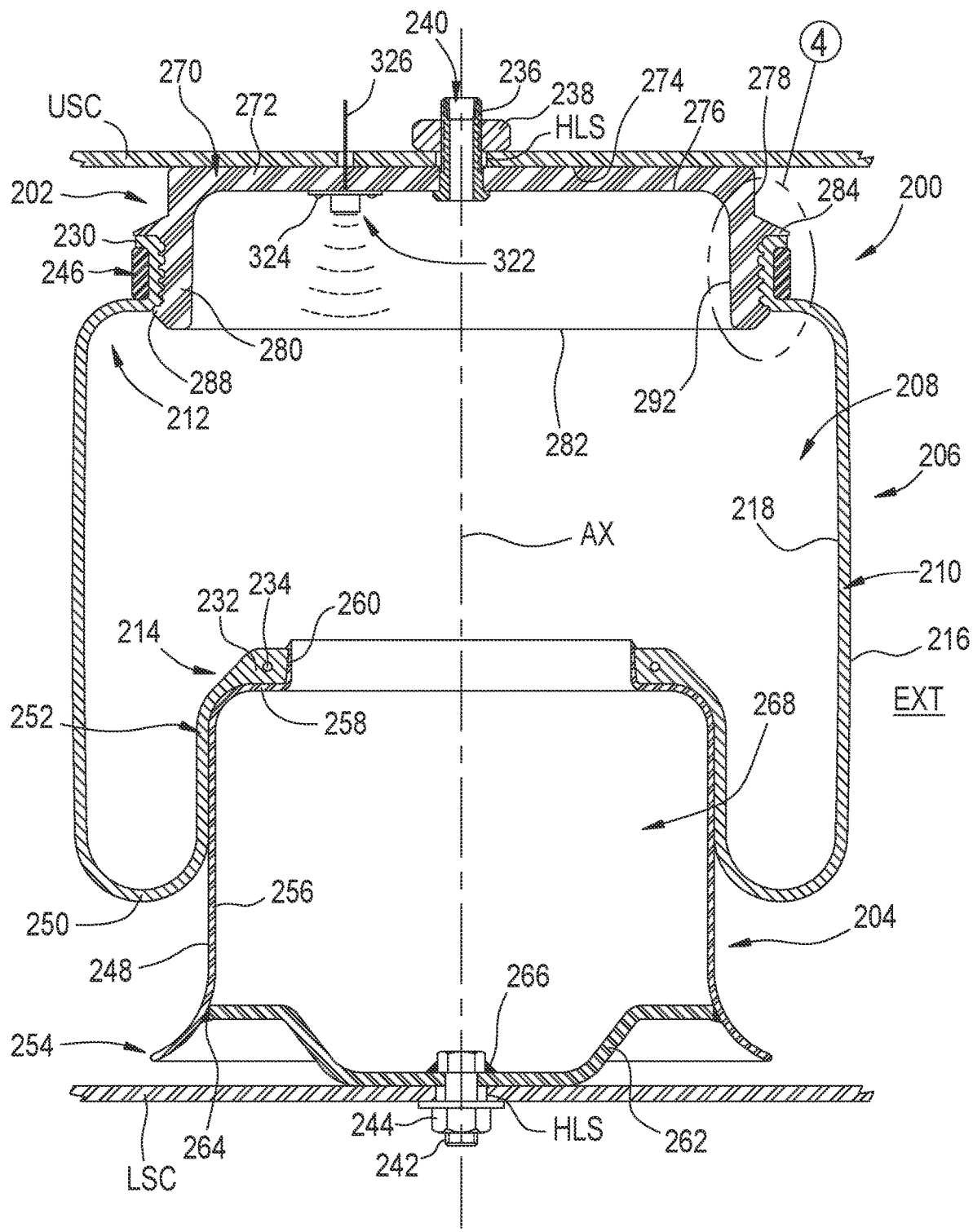
FIG. 3 is a cross-sectional side view of the gas spring assembly in FIG. 2 taken from along line 3-3 in FIG. 2.
Figure 4:
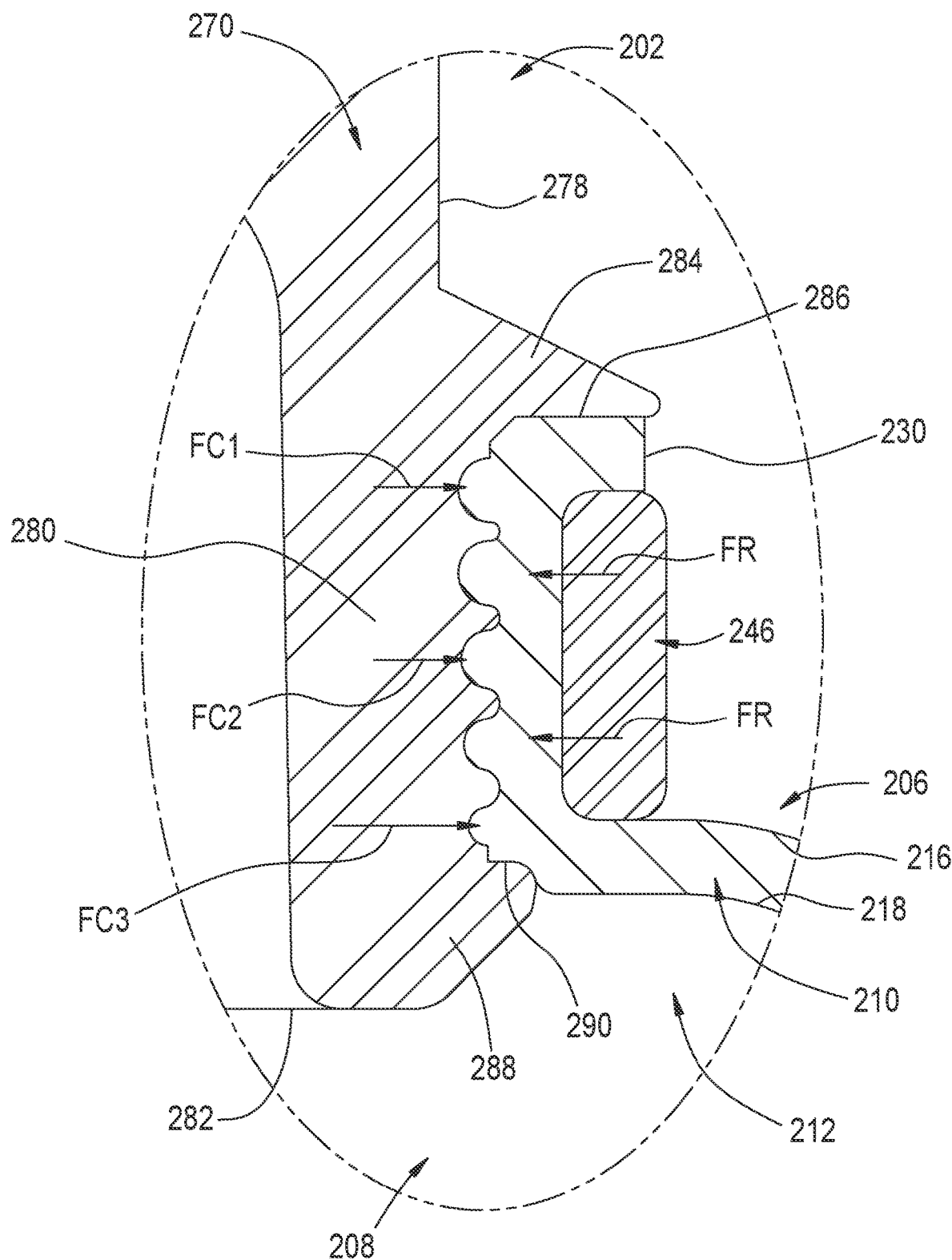
FIG. 4 is an enlarged, cross-sectional view of the portion of the gas spring assembly in FIGS. 2 and 3 identified as Detail 4 in FIG. 3.

One example of a gas spring assembly 200 in accordance with the subject matter of the present disclosure, such as may be suitable for use as gas spring assemblies 102 in FIG. 1, for example, is shown in FIGS. 2 and 3. Gas spring assembly 200 can have a longitudinally-extending axis AX (FIG. 3) and can include one or more end members, such as an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Flexible spring member 206 can be of any suitable size, shape, construction and/or configuration. Additionally, the flexible spring member can be of any type and/or kind, such as a rolling lobe-type or convoluted bellows-type construction, for example. Flexible spring member 206 can include a flexible wall 210 that can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 210 can extend in a generally longitudinal direction between opposing ends 212 and 214. Additionally, flexible wall 210 can include an outer surface 216 and an inner surface 218, which can at least partially define reservoir chamber 208. Additionally, as identified in FIG. 5, flexible wall 210 can include an outer or cover ply 220 that at least partially forms outer surface 216. Flexible wall 210 can also include an inner or liner ply 222 that at least partially forms inner surface 218. In some cases, flexible wall 210 can further include one or more reinforcing plies 224 and 226 disposed between outer and inner surfaces 220 and 222. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 206 can include at least one end wall section that terminates at a flexible wall edge. In the arrangement shown in FIGS. 2-5, for example, flexible wall 210 of flexible spring member 206 includes an end wall section (or portion) 228 (FIG. 5) disposed along end 212 that terminates at a flexible wall edge 230. In some cases, the one or more reinforcing plies can be exposed along edge 230. In some cases, the flexible spring member can include another end wall section (or portion) along end 214 that terminates in a flexible wall edge with one or more of the reinforcing plies exposed therealong. In other cases, however, flexible spring member 206 can include a mounting bead 232 disposed along one of ends of the flexible wall, such as end 214, for example. In such cases, the mounting bead, if provided, can, optionally, include a reinforcing element, such as an endless, annular bead wire 234, for example.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 2-4, for example, end member 202 is secured along a first or upper structural component USC, such as associated vehicle body BDY in FIG. 1, for example, and can be secured thereon in any suitable manner. For example, one or more securement devices, such as mounting studs 236, for example, can be included along end member 202. In some cases, the one or more securement devices (e.g., mounting studs 236) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 238 (FIG. 3) or other securement devices, for example. As an alternative to one or more of mounting studs 236, one or more threaded passages (e.g., blind passages and/or through passages) could be used in conjunction with a corresponding number of one or more threaded fasteners.

Additionally, a fluid communication port, such as a transfer passage 240 (FIG. 3), for example, can optionally be provided to permit fluid communication with spring chamber 208, such as may be used for transferring pressurized gas into and/or out of the spring chamber, for example. In the exemplary embodiment shown, transfer passage 240 extends through at least one of mounting studs 236 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 242 could be operatively connected to end member 204 and could extend through one of mounting holes HLS to receive a corresponding threaded nut 244, for example.

It will be appreciated that the one or more end members can be of any suitable type, kind, construction and/or configuration, and can be operatively connected or otherwise secured to the flexible spring member in any suitable manner. In the exemplary arrangement shown in FIGS. 2-4, for example, end member 202 is of a type commonly referred to as a top cap or top plate and is secured to end 212 of flexible spring member 206 using a retaining ring 246 that can be crimped or otherwise radially-inwardly deformed to capture at least a portion of flexible spring member 206 between the end member and the retaining ring. End member 204 is shown in the exemplary arrangement in FIGS. 2 and 3 as being of a type commonly referred to as a piston (or a roll-off piston) that has an outer surface 248 that abuttingly engages outer surface 216 of flexible spring member 206 such that a rolling lobe 250 is formed therealong. As gas spring assembly 200 is displaced between extended and collapsed conditions, rolling lobe 250 is displaced along outer surface 248 in a conventional manner.

As identified in FIG. 3, end member 204 extends generally between a first or upper end 252 and a second or lower end 254. End member 204 can include a longitudinally-extending outer side wall 256 that extends peripherally about axis AX and at least partially defines outer surface 248. End member 204 can also include an end wall 258 disposed along end 252 that extends generally transverse to axis AX. One example of a connection between the flexible spring member and the end member is shown in FIG. 3 in which end member 204 includes an inner side wall 260 that can extend longitudinally outward from end wall 258 in a direction away from end 254. End 214 of flexible spring member 206 can be received along inner side wall 260 such that a substantially fluid-tight seal is formed therebetween. It is to be understood, however, that the arrangement shown and described is merely exemplary and that any other suitable construction and/or configuration can alternately be used.

End member 204 can also include a base wall 262 that is disposed along end 254 of the end member and can be secured on or along outer side wall 256 in any manner suitable for forming a substantially fluid-tight connection, such as by using a flowed-material joint 264, for example. In some cases, mounting stud 242 can be operatively connected to base wall 262 in a manner suitable for forming a substantially fluid-tight seal therewith, such as by using a flowed-material joint 266, for example. Additionally, end member 204 can include a chamber 268 that is formed therein, which can be in fluid communication with spring chamber 208 or an external atmosphere EXT. In the exemplary arrangement shown, chamber 268 is at least partially defined by outer side wall 256, end wall 258, inner side wall 260 and base wall 262 and in fluid communication with spring chamber 208.

An end member in accordance with the subject matter of the present disclosure can include one or more walls having any number of one or more wall portions. In the arrangement shown in FIGS. 2-6, for example, end member 202 can include an end member wall 270 that can include an end wall portion 272 that is disposed transverse to axis AX. End wall portion 272 can include an outer surface 274 and can optionally include an inner surface 276. In a preferred arrangement, at least a portion of outer surface 274 can be approximately planar and can be dimensioned for securement on or along an associated structural component (e.g., upper structural component USC). Additionally, end wall portion 272 can extend outwardly to an outer peripheral edge 278.

End member wall 270 of end member 202 can also include a securement wall portion 280 that extends axially from along end wall portion 272 toward a distal edge 282. In some cases, the securement wall portion can be spaced radially inwardly from the outer peripheral edge such that a shoulder or shoulder wall portion can be formed along the end member. In other cases, a shoulder wall portion 284 can project radially outward beyond outer peripheral edge 278 such that a shoulder surface 286 can be formed along end member 202. In some cases, shoulder surface 286 can face in a direction away from outer surface 274 and toward flexible spring member 206. Additionally, or in the alternative, securement wall portion 280 can include a shoulder wall portion 288 that projects in a radially-outward direction adjacent distal edge 282 such that a shoulder surface 290 can be formed along end member 202. In some cases, shoulder surface 290 can face in a direction away from distal edge 282 and toward shoulder surface 286, if included.

Figure 5:
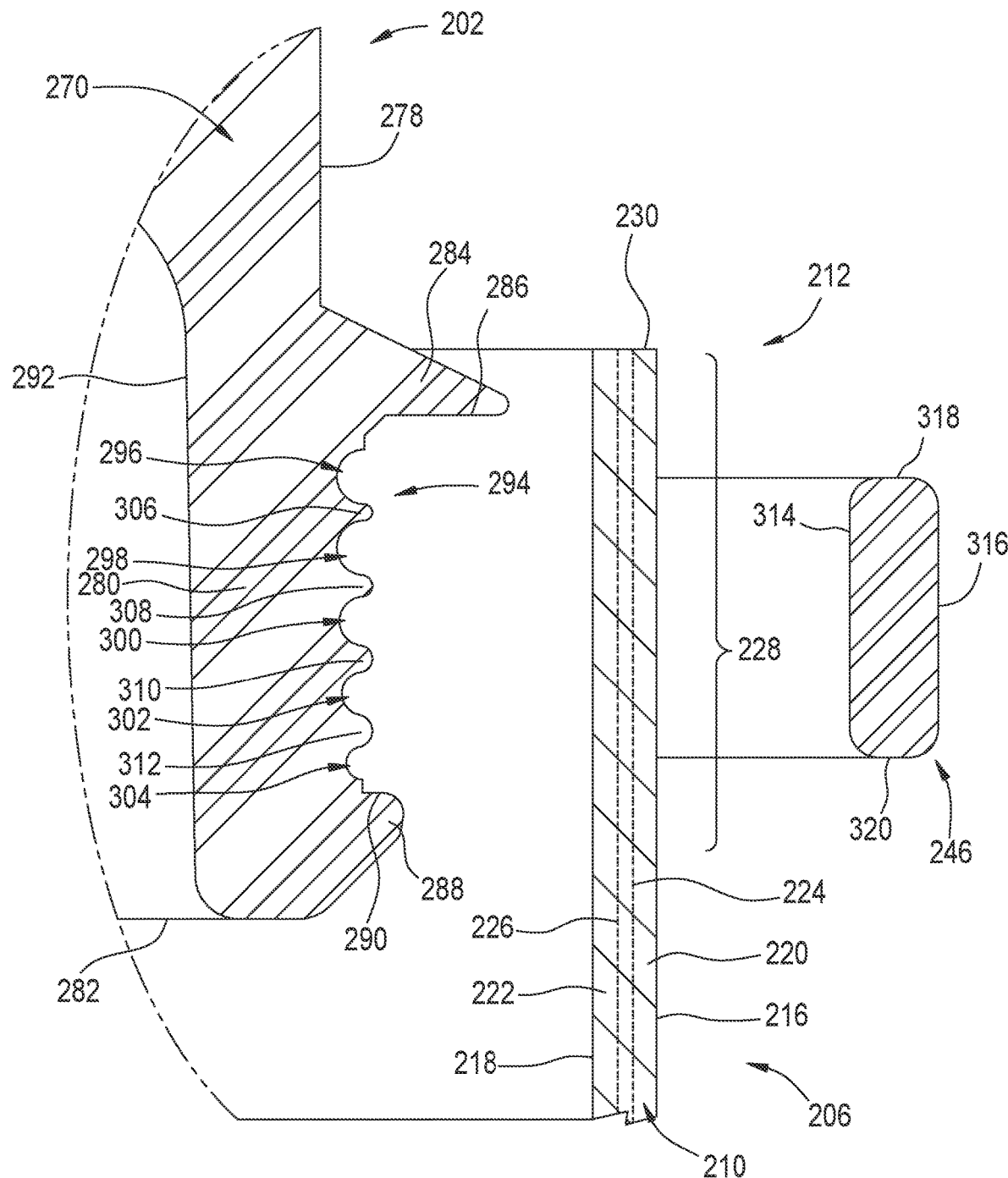
FIG. 5 is an exploded view of the portion of the gas spring assembly in FIG. 4.

As identified in FIG. 5, securement wall portion 280 can include an inside surface 292 and an outside surface 294 with at least the outside surface extending peripherally about axis AX. Additionally securement wall portion 280 can include any combination of one or more features and/or elements capable of generating a variable-compression wedge effect with the associated flexible wall (e.g., flexible wall 210) in accordance with the subject matter of the present disclosure. As one example, securement wall portion 280 can include a plurality of grooves extending axis AX and at least partially around the outside surface of the securement wall portion. Additionally, securement wall portion 280 can include a plurality of ridges that extend peripherally about axis AX and at least partially around the outside surface of the securement wall portion. The plurality of grooves can be positioned in spaced-apart relation to one another such that one of the ridges is disposed between adjacent ones of the grooves. In some cases, one or more of the groove and/or one or more of the ridges can have an endless, annular form.

In a preferred arrangement, the securement wall portion can include at least three grooves having progressively variable geometric features, such as depth, width, spacing and/or cross-sectional shape. Terms such as "progressive," "progressively," and the like broadly refer to variations changing from a minimum size, shape, dimension, value, condition and/or characteristic to a corresponding maximum size, shape, dimension, value, condition and/or characteristic (or from a maximum size, shape, dimension, value, condition and/or characteristic to a minimum size, shape, dimension, value, condition and/or characteristic) by sequentially increasing (or decreasing) the size, shape, dimension, value, condition and/or characteristic.

While it may be preferred that the progressively variable geometric feature or features change from a minimum size, shape, dimension, value, condition and/or characteristic to a maximum size, shape, dimension, value, condition and/or characteristic in a substantially continuous, sequential manner, it will be appreciated that, in some cases, one or more discontinuities can be included within such a progressively variable sequence without departing from the subject matter of the present disclosure. For example, in some cases, progressively variable geometric features can include two or more occurrences of a geometric feature having a common size, shape, dimension, value, condition and/or characteristic. In a preferred arrangement, any such occurrences can be disposed adjacent one another, such as are represented by the following exemplary relationships:

$$GF1 \leq GF2 < GF3 < GF4;$$

$$GF1 < GF2 \leq GF3 < GF4; \text{ and,}$$

$$GF1 > GF2 \geq GF3 \geq GF4 \geq GF5.$$

It will be appreciated that in any of such cases, at least three geometric features are included that define or otherwise establish a set of progressively variable geometric features that change from a minimum size, shape, dimension, value, condition and/or characteristic to a corresponding maximum size, shape, dimension, value, condition and/or characteristic (or from a maximum size, shape, dimension, value, condition and/or characteristic to a minimum size, shape, dimension, value, condition and/or characteristic) in accordance with the subject matter of the present disclosure.

As identified in FIG. 5, securement wall portion 280 includes a groove 296, a groove 298, a groove 300, a groove 302, and a groove 304 with groove 296 disposed toward shoulder surface 286 and groove 304 disposed toward shoulder surface 290. The grooves are disposed in axially-spaced relation to one another such that securement wall portion 280 includes a ridge 306 disposed between grooves 296 and 298, a ridge 308 disposed between grooves 298 and 300, a ridge 310 disposed between grooves 300 and 302, and a ridge 312 disposed between grooves 302 and 304. In the arrangement shown in FIGS. 3-6, securement wall portion 280 includes an outer peripheral extent, which is represented by reference line OPE in FIG. 6, that is at least partially defined by ridge points 306P, 308P, 310P and 312P of ridges 306, 308, 310 and 312, respectively. In a preferred arrangement, ridge points 306P-312P can be disposed in approximate alignment with one another such that the reference line representing outer peripheral extent OPE is at least approximately aligned with longitudinal axis AX.

Figure 6:
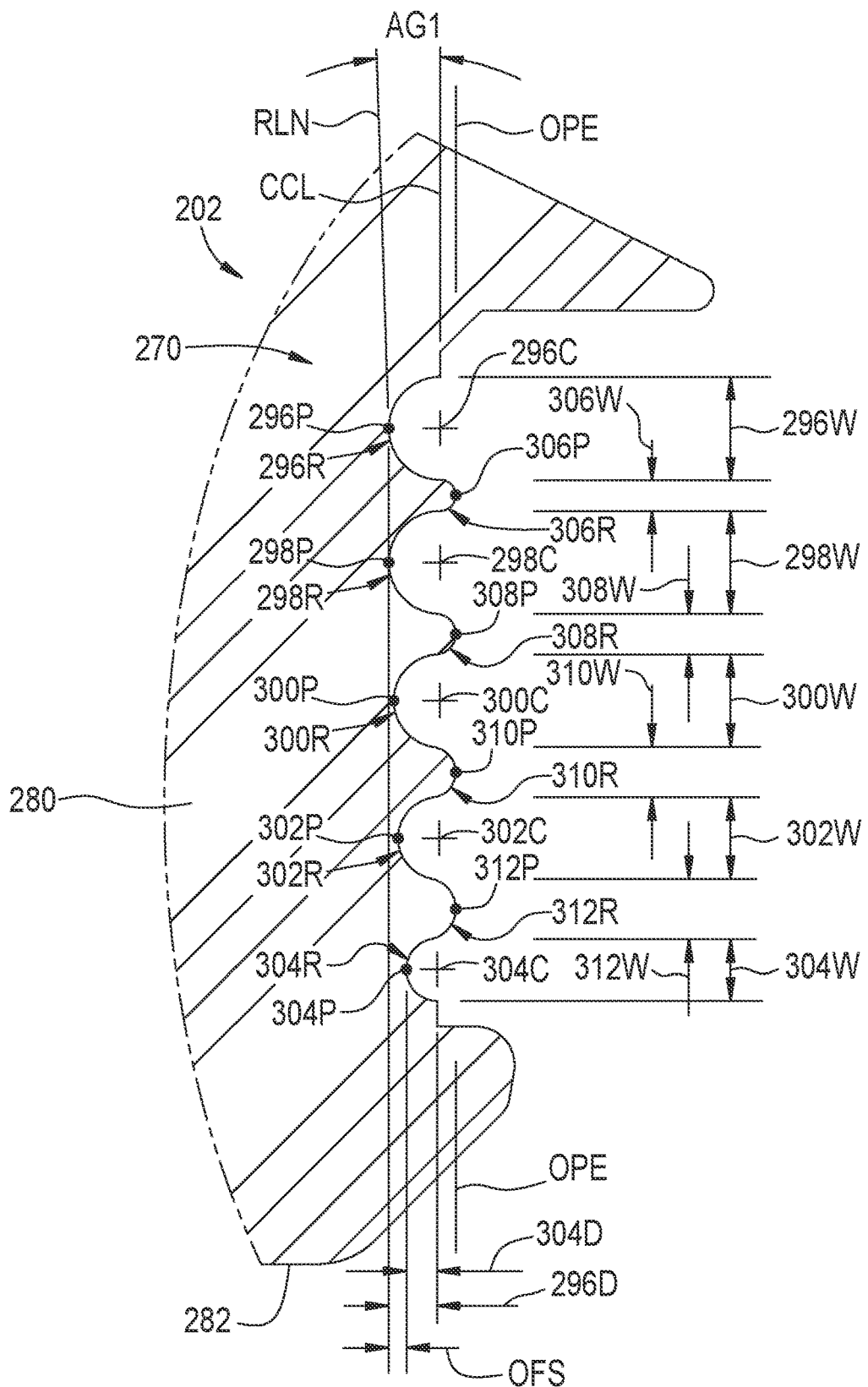
FIG. 6 is a further enlarged, cross-sectional view of the portion of the end member in FIGS. 4 and 5.

As identified in FIG. 6, grooves 296-304 can have approximate centerpoints, which are represented by item numbers 296C, 298C, 300C, 302C and 304C, and a maximum depth (or a minimum cross-section dimension) at corresponding root points 296P, 298P, 300P, 302P and 304P. Additionally, grooves 296 and 304 are shown in FIG. 6 as having groove depths, which are represented by reference dimensions 296D and 304D. While only two groove depths are identified in FIG. 6, it will be recognized and understood that grooves 298-302 also have corresponding groove depths, which may be referred to herein by reference numbers 298D, 300D and 302D.

Any suitable combination of grooves, ridges and/or other features can be used to form a variable-compression wedge effect engagement with an end wall section (e.g., end wall section 228) of an associated flexible wall (e.g., flexible wall 210). As one example of such a construction, three or more of grooves 296-304 can have progressively decreasing (or increasing) groove depths. As is identified in FIG. 6, root points 296P-304P are shown as being progressively offset such that groove 296 has groove depth 296D and groove 304 has groove depth 304D. Groove depth 304D is shown as being less than groove depth 296D such that a progressive offset is formed by the grooves, as is represented in FIG. 6 by reference dimension OFS. As such, three or more of groove depths 206D-304D can correspond to the relationship:

$$296D > 298D \geq 300D \geq 3020 > 304D.$$

Additionally, it will be appreciated that a root or reference line RLN extending between three or more of root points 296D-304D is disposed at an acute angle relative to longitudinal axis AX, outer peripheral extent OPE and/or a common centerline CCL of two or more of centerpoints 296C-304C, which acute angle is represented in FIG. 6 by reference dimension AG1.

Securement wall portion 280 has a cross-sectional surface profile (not identified) formed along outside surface 294. The surface profile includes a plurality of curved or curvilinear profile sections that are disposed in longitudinally-spaced relation to one another. The plurality of profile sections can include two or more concave profile sections, such as can form grooves 296-304, for example, and two or more convex profile sections, such as can form ridges 306-312, for example. It will be appreciated that such concave profile sections and such convex profile sections can be of any suitable size, shape and/or configuration. As one example, one or more of the concave and/or convex profile sections can have an approximately semi-circular or otherwise arcuate shape. In such cases, the profile sections can have an approximate centerpoint and a corresponding radius.

In the exemplary arrangement shown in FIGS. 3-6, the concave profile sections that can, in some cases, at least partially define grooves 296-304 can have corresponding radii 296R, 298R, 300R, 302R and 304R, respectively. Radii 296R-304R can extend from corresponding centerpoints 296C-304C and can vary progressively such that three or more of the radii 296R-304R correspond the relationship:

$$296R > 298R \geq 300R \geq 302R > 304R.$$

In some cases, as discussed above, centerpoints 296C-304C can be disposed in approximate alignment with one another. Under such conditions, progressive variation of radii 296R-304R can result in root points 296P-304P having the progressive offset discussed above and the corresponding grooves having the progressive groove depth variations discussed above, in accordance with the subject matter of the present disclosure.

Additionally, in the arrangement shown in FIGS. 3-6, the convex profile sections that can, in some cases, at least partially define ridges 306-312 can have corresponding radii 306R, 308R, 310R and 312R, respectively. Radii 306R-312R can vary in size such that two or more of the radii correspond to the relationship:

$$306R < 308R \leq 310R < 312R.$$

In some cases, radii 306R-312R can extend from corresponding centerpoints (not shown) that can be disposed in progressive offset relation to one another such that ridge points 306P-312P can be disposed in approximate alignment with one another and can at least partially define outer peripheral extent OPE of at least part of securement wall portion 280, such as has been discussed above.

Furthermore, or as an alternative, one or more other features or characteristics of the profile sections of the cross-sectional surface profile of securement wall portion 280 can vary progressively in accordance with the subject matter of the present disclosure. For example, the profile sections corresponding to grooves 296-304 and/or the profile sections corresponding to ridges 306-312 can vary progressively along the longitudinal length of securement wall portion 280. As one example, the profile sections corresponding to grooves 296-304 can have groove widths (or heights) 296W, 298W, 300W, 302W and 304W. In some cases, groove widths 296W-304W can vary in size relative to one another such that three or more of the groove widths correspond to the relationship:

$$296W > 298W \geq 300W \geq 302W > 304W.$$

As another example, the profile sections corresponding to ridges 306-312 can have ridge widths (or heights) 306W, 308W, 310W and 312W. In some cases, ridge widths 306W-312W can vary in size relative to one another such that two or more of the ridge widths correspond to the relationship:

$$306W < 308W \leq 310W < 312W.$$

As indicated above, end wall section 228 can be urged into and retained in abutting engagement with securement wall section 280 in any manner suitable for forming a substantially fluid-tight seal between end member 202 and flexible spring member 206. As one example, gas spring assembly can include retaining ring 246 that can take the form of an endless annular ring that includes an inside surface 314, an outside surface 316 spaced radially outward from the inside surface, and opposing edges 318 and 320 that are spaced longitudinally from one another and can at least partially define an overall length of the retaining ring. In an uninstalled condition, retaining ring 246 can be dimensioned to extend peripherally about end wall section 228 and securement wall section 280. The retaining ring can be positioned along end wall section 228 and securement wall section 280. The retaining ring can then be crimped or otherwise deformed in a radially-inward direction such that a retention force is applied in the radially-inward direction to urge end wall section 228 into abutting engagement with securement wall section 280. In a preferred arrangement, at least inside surface 314 of retaining ring 246 can have an approximately flat cross-sectional profile such that the retaining ring can apply the retention force approximately uniformly along the longitudinal length of the securement wall portion, such as is represented by arrows FR in FIG. 4, for example. As a result of the progressive surface profile along outside surface 294 of securement wall portion 280, a progressively increasing compression force can be applied along end wall section 228 such that material of the end wall section can flow into and at least partially fill one or more of grooves 296-304. In this manner, a variable-compression wedge effect can be generated along end wall section 228 of flexible wall 210, such as is represented by progressive length arrows FC1, FC2 and FC3 in FIG. 4, for example. In some cases, such an effect can provide improved sealing and/or retention without the use of increased retention forces acting in the radially-inward direction, which can undesirably deflect end member 202 and/or result in other undesired occurrences.

It will be appreciated that an end member in accordance with the subject matter of the present disclosure can be formed from any suitable material or combination of materials, such as one or more metal materials (e.g., steel, aluminum) and/or one or more polymeric materials. Non-limiting examples of such one or more polymeric materials can include fiber-reinforced polypropylene, fiber-reinforced polyamide, or unreinforced (i.e., relatively high-strength) thermoplastic (e.g., polyester, polyethylene, polyamide, polyether or any combination thereof), for example.

A height or distance sensing device 322, such as may be suitable for use as one of height sensing devices 126 in FIG. 1, for example, is, optionally, shown in FIG. 3 as being disposed within spring chamber 208 along end member 202 and being secured thereto using suitable fasteners 324. Height sensing device 322 can be of any suitable type, kind and/or construction, such as an ultrasonic sensor that transmits and receives ultrasonic waves WVS (FIG. 3), for example. Additionally, it will be appreciated that height sensing device 322 can be connected to other systems and/or components of a vehicle suspension system in any suitable manner. As shown in FIGS. 2 and 3, height sensing device 322 includes a lead or connection 326 that can be used for such communication purposes, such as is indicated by leads 128 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member dimensioned to engage an associated flexible spring member of an associated gas spring assembly, said end member comprising:
   an end member wall having a longitudinal axis and including an end wall portion and a securement wall portion;
   said end wall portion extending transverse to said axis and including an outer surface dimensioned to abuttingly engage an associated structural component; and,
   said securement wall portion extending longitudinally from along said end wall portion, said securement wall portion disposed radially outward of said axis such that at least a portion of said outer surface of said end wall portion is disposed radially inward of said securement wall portion, and said securement wall portion including an outer peripheral extent with first, second and third grooves extending radially inward into said securement wall portion from along said outer peripheral extent with first and second ridges formed along said securement wall portion between said first and third grooves, said first groove extending radially into said securement wall portion a first groove depth, said third groove extending radially into said securement wall portion a third groove depth that is less than said first groove depth, and said second groove extending radially into said securement wall portion a second groove depth that is less than said first groove depth and greater than said third groove depth such that said first, second and third grooves are capable of generating a variable-compression wedge effect during abutting engagement with the associated flexible spring member.

2. An end member according to claim 1, wherein said securement wall portion includes a fourth groove disposed adjacent said third groove opposite said second groove and a third ridge positioned between said third groove and said fourth groove.

3. An end member according to claim 2, wherein said fourth groove extends radially into said securement wall portion a fourth groove depth that is less than said third groove depth of said third groove.

4. An end member according to claim 1, wherein said first, second and third grooves have a curvilinear cross-sectional profile with a curvature and said curvature of said first, second and third grooves progressively decrease from said first groove to said third groove.

5. An end member according to claim 1, wherein said first, second and third grooves have a curvilinear cross-sectional profile with at least a portion of two or more of said profiles being approximately semicircular and having a radius of curvature.

6. An end member according to claim 5, wherein said radii of curvature of said two or more profiles progressively decrease from said first groove to said third groove.

7. An end member according to claim 1, wherein said first, second and third grooves have a curvilinear cross-sectional profile with an approximate centerpoint, and said approximate centerpoints are disposed in approximate alignment with one another in an axial direction.

8. An end member according to claim 1, wherein said first and second ridges include a curvilinear cross-sectional profile having a curvature, and said curvature of said first ridge is greater than said curvature of said second ridge.

9. An end member according to claim 1, wherein said first and second ridges include a curvilinear cross-sectional profile with at least a portion of said profiles being approximately semicircular and having a radius of curvature.

10. An end member according to claim 9, wherein said radii of curvature of said first ridge is greater than said radius of curvature of said second ridge.

11. An end member according to claim 1, wherein said first and second ridges have a curvilinear cross-sectional profile with an approximate centerpoint, and said approximate centerpoints are disposed in radially-offset relation to one another.

12. An end member dimensioned to engage an associated flexible spring member of an associated gas spring assembly, said end member comprising:
   an end member wall having a longitudinal axis and including an end wall portion and a securement wall portion;
   said end wall portion extending transverse to said axis and including an outer surface dimensioned to abuttingly engage an associated structural component; and,
   said securement wall portion extending axially from along said end wall portion and disposed radially outward of said axis such that at least a portion of said outer surface of said end wall portion is disposed radially inward of said securement wall portion, said securement wall portion having a longitudinal length, and said securement wall portion including an outer surface dimensioned to abuttingly engage the associated flexible spring member, said securement wall portion including a cross-sectional profile with at least first, second and third concave profile sections and at least first and second convex profile sections interposed between said first and third concave profile sections, said first concave profile having a first root diameter between diametrically-opposed first root points, said third concave profile section having a third root diameter between diametrically-opposed third root points with said third root diameter being greater than said first root diameter, and said second concave profile section having a second root diameter between diametrically-opposed second root points with said second root diameter being greater than said first root diameter and less than said third root diameter such that a reference line extending through one of said first, second and third root points and a different one of said first, second and third root points along a common side of said longitudinal axis is disposed at an acute angle relative to said longitudinal axis.

13. An end member according to claim 12, wherein said surface profile includes a fourth concave profile section and a third convex profile section interposed between said third concave profile section and said fourth concave profile section.

14. An end member according to claim 13, wherein said surface profile includes a fifth concave profile section and a fourth convex profile section interposed between said fourth concave profile section and said fifth concave profile section.

15. An end member according to claim 12, wherein said concave profile sections have a height with said heights decreasing progressively along said longitudinal length from at least said first concave profile to said third concave profile.

16. An end member according to claim 12, wherein said concave profile sections have a curvature and an approximate centerpoint with said curvatures decreasing progressively from at least said first concave profile to said third concave profile and with said approximate centerpoint of at least said first, second and third concave profiles disposed in approximate alignment with one another in said axial direction.

17. An end member according to claim 12, wherein said convex profile sections have a maximum cross-sectional dimension at a ridge point with said ridge points disposed in approximate alignment with one another in said axial direction.

18. An end member according to claim 12, wherein said convex profile sections have a height with said heights increasing progressively along said longitudinal length from at least said first convex profile to said second concave profile.

19. A gas spring assembly comprising:
a flexible spring member having a longitudinal axis and including a flexible wall extending peripherally about said longitudinal axis to at least partially define a spring chamber, said flexible wall extending between a first end and a second end spaced longitudinally from said first end, and said flexible wall including an end wall portion disposed along at least one of said first and second ends and terminating at a flexible wall edge;
a first end member secured along said first end of said flexible spring member such that a substantially fluid-tight seal is formed therebetween;
a second end member according to claim 1, said second end member secured along said second end of said flexible spring member such that a substantially fluid-tight seal is formed therebetween; and,
a retaining ring extending peripherally about said axis and in abutting engagement with said end wall portion of said flexible wall such that said end wall portion of said flexible wall is biased into engagement with at least a longitudinal section of said securement wall portion of said second end member.

20. An end member dimensioned to engage an associated flexible spring member of an associated gas spring assembly, said end member comprising:
an end member wall having a longitudinal axis and including an end wall portion and a securement wall portion;
said end wall portion extending transverse to said axis and including an outer surface dimensioned to abuttingly engage an associated structural component; and,
said securement wall portion extending axially from along said end wall portion and disposed radially outward of said axis such that at least a portion of said outer surface of said end wall portion is disposed radially inward of said securement wall portion, said securement wall portion having a longitudinal length, and said securement wall portion including an outer surface with a surface profile dimensioned to abuttingly engage the associated flexible spring member, said surface profile including at least first, second and third concave profile sections with at least first and second convex profile sections interposed between said first and third concave profile sections;
said first concave profile having a first root diameter between diametrically-opposed first root points;
said third concave profile section having a third root diameter between diametrically-opposed third root points with said third root diameter being greater than said first root diameter;
said second concave profile section having a second root diameter between diametrically-opposed second root points with said second root diameter being greater than said first root diameter and less than said third root diameter;
with a reference line extending through one of said first, second and third root points and a different one of said first, second and third root points along a common side of said longitudinal axis disposed at an acute angle relative to said longitudinal axis; and,
with:
said concave profile sections each having a height with said heights decreasing progressively along said longitudinal length from at least said first concave profile to said third concave profile; and/or,
said convex profile sections each having a height with said heights increasing progressively along said longitudinal length from at least said first convex profile to said second concave profile.

* * * * *